(No Model.)
T. ROSE.
PROCESS OF ICE MAKING AND REFRIGERATING.
No. 446,076. Patented Feb. 10, 1891.
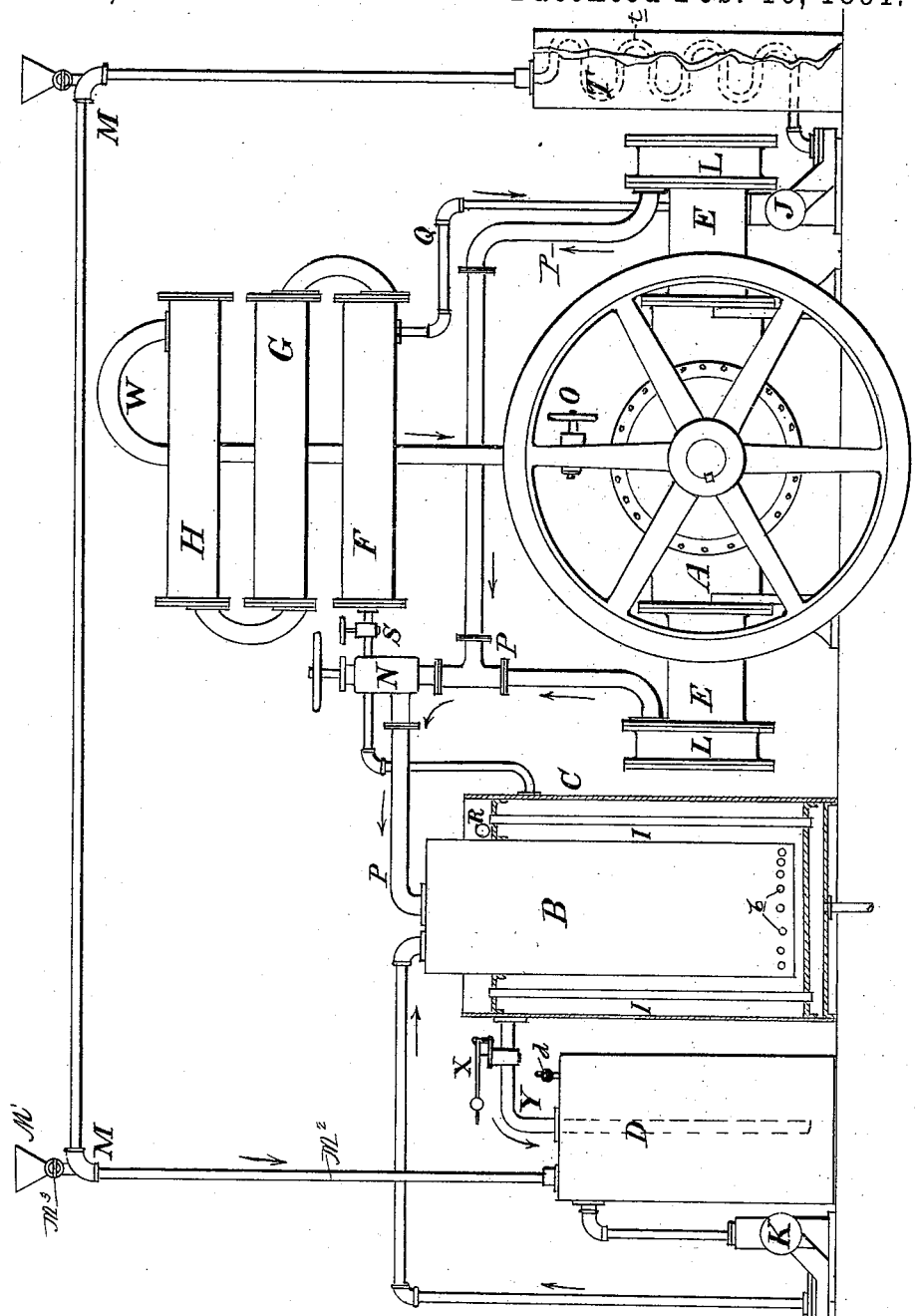
WITNESSES:
Hugh S. Van Duyn
William Rockwell
INVENTOR
Thomas Rose
BY
T. J. W. Robertson
ATTORNEY

UNITED STATES PATENT OFFICE.

THOMAS ROSE, OF JERSEY CITY, NEW JERSEY.

PROCESS OF ICE-MAKING AND REFRIGERATING.

SPECIFICATION forming part of Letters Patent No. 446,076, dated February 10, 1891.

Application filed December 10, 1888. Serial No. 293,150. (No model.)

*To all whom it may concern:*

Be it known that I, THOMAS ROSE, a subject of the Queen of Great Britain and Ireland, and a resident of Jersey City, in the county of Hudson and State of New Jersey, have invented certain new and useful Improvements in the Process of Ice-Making and Refrigeration, of which the following is a specification.

My improvements involve the use of a supersaturated solution of hydrate of ammonia as the refrigerating agent and a mode by which the strength of the said solution can be varied at will within certain limits.

Heretofore ammonia has been employed by three distinct methods, all of which are more or less defective. In the first, which is a mechanical process of compression, no water is admitted into the machine, the charge being composed entirely of anhydrous ammonia—
*i. e.*, ammoniacal gas compressed until it liquefies—and refrigeration is accomplished by allowing this liquefied gas to expand. Powerful compression-pumps are provided to reproduce the liquid gas, which renders the action continuous. The process, however, is both costly and dangerous by reason of the excessive pressure needed to liquefy the gas, reaching as high as fifteen to twenty atmospheres in extreme cases and rarely ranging below ten atmospheres, even in temperate latitudes.

In the second, known as the "absorption" or "distillation" process, no pump is employed. Here compression is effected by passing steam-pipes through stills charged with the ordinary hydrate of ammonia of commerce until the liberated gas accumulates sufficient pressure to liquefy itself in another portion of the apparatus. This liquid is analogous to that formed by the pump process, the only variation being that it is produced in a different manner, and, as it is utilized in precisely the same way, the pressure required to liquefy it must needs be about the same, whereas the quantity of condensing-water used is much greater from the fact that all the heat acquired in the stills has to be removed before the weak solution therefrom will reabsorb the now expanded gas, and this it must do in order to render the process continuous.
By the third method, which is a vacuum process, the elements of danger and excessive use of condensing-water are very effectually avoided, but the range for expansion is so limited that vacuum-pumps of very large capacity and great accuracy of construction are indispensable.

The main object of my present invention is to take a medium course between these extremes, and so to remedy the defects of each.

The novelty of my invention mainly consists in the use of supersaturated hydrate of ammonia in such a manner that its strength can be varied at will within certain limits by increasing or diminishing the pressure in the generating tank or vessel at the same time that it admits of the pressure being kept under thorough control, and always confined to a moderate and absolutely safe point under the most extreme conditions, thus adapting it for use in any part of tne world. This has never before been accomplished by any ammonia system, with the exception of the vacuum process, for which I have been granted several Letters Patent during and since the year 1880.

My present purpose is to cover a field not entered by either of the methods under consideration or any other—viz., that of employing a supersaturated solution under low pressure. This, to the best of my knowledge, is entirely new, and I therefore claim it as part of my invention, and I propose to effect the same through the instrumentality of a compression-pump. Any description will suffice; but I prefer the type as represented in the accompanying drawing, for the reason that it has been designed especially for this purpose.

My previous inventions all require a solution at or below atmospheric saturation at ordinary temperatures, and consequently only admit of a range of about twelve to thirteen pounds to work in—*i. e.*, between a partial vacuum of twenty-six to twenty-seven inches of a mercury column in the vacuum-chamber and atmospheric pressure in the condenser; but by adopting the supersaturation principle three or four times that range is easily attainable, owing to the fact that a given quantity of water will absorb more or less ammoniacal gas in exact proportion to the pressure and temperature reached, and my present invention is intended to take advantage of and apply this natural law. By so doing all dangerous pressures are avoided on the one hand and greatly increased working facilities are secured on the other. For example, the solution can be charged with gas at, say, three atmospheres, which is a perfectly safe pressure to carry in the compression-tank. Then by opening the supply-valve communicating through the expansion-pipes with the induction-ports of the compression-pump for expansion (which is the true source of refrigation in every description of machine) three times the capacity of the vacuum process is at once attained. The advantage of this method in reducing the cost of plant is manifest, simply because a much smaller apparatus will do the same amount of work. I do not, however, confine myself to any given pressure or degree of saturation, except to those lying between what is required for the high-pressure machines at one extreme and atmospheric pressure, as in my previous process, at the other.

The apparatus devised by me for carrying out my process involves a store-tank to receive the exhausted solution as it returns from the refrigerator, a compression-tank in which to prepare a continuous supply of supersaturated solution, a compression-pump to inject the gas therein, small circulating-pumps to insure a suitable flow of the refrigerating solution, a regulating-valve, expansion-pipes of larger area than the supply-pipe leading thereto and attached to the compression and circulating pumps, as shown, a refrigerating tank or vessel similar to those used in other forms of machine, and suitable pipes, connections, valves, gages, &c.

To more particularly describe my invention, I will now refer to the accompanying drawing, wherein like letters refer to the same parts.

The machine is represented in elevation and partly in section. Any distribution of the component parts may be effected, providing that the proper pipe connections are made.

The apparatus as here shown is spread out to facilitate description. The dimensions will necessarily vary to meet specific requirements as to capacity, locality, uses, &c. Hence I do not confine myself to any definite proportions.

The letter A indicates a compression-pump, which may be of any suitable description, and W a pipe leading to the gas-induction ports of said pump from the chamber H, for the purpose more fully hereinafter explained. The eduction-ports of said pump are connected with the chambers L L, which latter communicate with the compression-tank B C through pipes P P.

The small circulating-pumps J K can be operated from any convenient part of the structure and take any suitable form that may be desired.

The store-tank D may be constructed of either cast-iron or boiler plates riveted together in the usual manner. Its office is to receive the weak solution on its return from the refrigerating-pipes and store it for future use in the compression-tank, into which it is pumped as required by K. The compression-tank B C may also be composed of wrought-iron plates. Its function is to receive the gas from the compression-pump and the weak solution from the store-tank D, whereby they are brought together again in such quantities and proportions as are necessary to insure a continuous supply of the supersaturated hydrate-of-ammonia solution for the purposes of refrigeration. The inner cylinder B is open at the bottom and provided with a belt of perforations $b$ a few inches from its lower edge. The gas from the compression-pump enters at the top of this cylinder by way of pipes P P, as shown, and forces the solution back into C until it reaches the said perforations, when it will pass through them and be uniformly distributed in and dissolved by the solution in C. By this arrangement an extensive area is provided to insure thorough solution of the gas, and also to dissipate the heat consequent upon such solution. This is necessary, because the gas gives up as much heat again upon being redissolved as it took up from the solution which previously contained it when leaving the same. In other words, it is here that all the heat abstracted from the water being frozen or other substances being refrigerated, as the case may be, has to be dispersed. To effect this, a number of boiler-tubes are inserted vertically in C, as represented at I I. The outer part C of the compression-tank is drawn in section, the better to illustrate this feature, and, further, to show the double bottom to C by way of which the condensing-water enters the said tubes I I, rises through them, and is discharged at R. The cylinder B also forms a receptacle for a portion or all of the solution from C when the machine is at rest, and so prevents the possibility of any backflow into the compression-pump, which occurs otherwise by reason of unequal pressures in various parts of the apparatus.

To charge the machine, the saturated solution of ammonia is introduced through the funnel M′ and pipe M$^2$ into the tanks D and B C, the solution first filling the tank D and then running over into the tank B C until it is filled within a foot of its top, after which the supply is stopped and the cock M$^3$ closed. The upper portion of the tank C will then be filled with gas under pressure.

The next point is to prepare the supersaturated solution, and this I effect by opening the valves N O and starting the pumps A, J, and K, and then open the valves S, which will admit solution to F. The gas will rise through G H and pass by way of pipe W into the body of the pump A, and from thence to the cylinders E E of the same through the piston-valves, to which allusion has already been made, after which it will be forced through the eduction-valves into the valve-chambers L L, and thence by way of pipes P P into the condensing-tank B C, as described. The solution through S, after being deprived of a large portion of its gas by reason of the expansion, will flow along pipe F and down Q to the force-pump J, which will send it through the pipes $t$ in the refrigerator T, and from thence to the store-tank D by way of pipe M M. The force-pump K passes a corresponding quantity of solution from D to B C, thus continuing the circulation.

When the machine has been running for a short time, the store-tank D will necessarily be filled with a weaker solution than it contained at starting, because much of the gas originally held in solution will, by reason of the expansion, be transferred to and retained in solution in B C, forming the supersaturated hydrate of ammonia with which to continue the process of refrigeration. During the time that the above transfer is gradually taking place the solution from F is constantly growing colder, and when the proper stage of supersaturation has been reached it will have fallen considerably below zero, (Fahrenheit,) by reason of the expansion constantly increasing as the solution in B C becomes richer. This process has only to be gone through when charging the apparatus. Afterward the separate solutions will always maintain a relative degree of strength, and this can be varied at any time within certain limits by regulating the supply-valve S and the safety-valve X. For example, if more solution be run through in a given time then the pressure will rise in F G H, and consequently less gas will be eliminated. If a smaller quantity be admitted, then the pressure will fall and more gas will be abstracted proportionately and forced back into B C, and so on.

In the event of any air being inadvertently let into the machine it will accumulate at the top of C and the pressure will increase. The result will be to open the safety-valve X, when the air, and it may be some gas, will pass over into D by way of pipe Y, which reaches nearly to the bottom of D. Now, as D invariably contains a much weaker solution than B C, this gas will be at once dissolved, and the air only will rise to the top of D, where it will be let off by any suitable means, such as the valve $d$. It will be perceived that by forcing the ammoniacal gas into the chamber B and forcing the saturated solution out into the chamber C through the openings $b$ the pressure of the column of liquid in the chamber C is made to effect the solution of the gas in said liquid.

The tanks D and B C are fitted with glass gages to indicate the level of the solution therein.

Pressure-gages are attached to B C and the pipes F G H.

The pipes F G H, the refrigerator T, and the small pump J are well jacketed with hair felt or some other good non-conducting substance to prevent heat from being absorbed from the surrounding atmosphere, &c.

Having thus fully described my invention, I claim as new and desire to secure by Letters Patent—

1. In the herein-described process of refrigeration, the mode of preparing supersaturated hydrate of ammonia, the same consisting in forcing the ammoniacal gas eliminated from a supersaturated solution of ammonia by expansion during the refrigerating operation into a saturated solution of ammonia left after the elimination of the gas therefrom, substantially as specified.

2. The herein-described process of refrigeration, the same consisting in forcing the ammoniacal gas eliminated from a supersaturated solution of ammonia during the refrigerating operation into the saturated solution of ammonia left after the elimination of the ammonia-gas during such refrigerating operation and regulating the amount of supersaturation by the pressure of the unabsorbed gas, substantially as specified.

Signed at New York city, in the county of New York and State of New York, this 8th day of December, A. D. 1888.

THOMAS ROSE.

Witnesses:
　JOSEPH B. BRAMAN,
　WILLIAM ROCKWELL.